United States Patent
Nagaoka et al.

(10) Patent No.: US 6,983,647 B2
(45) Date of Patent: Jan. 10, 2006

(54) STRUCTURE FOR MOUNTING STEERING ANGLE SENSOR FOR STEERING

(75) Inventors: Yasutaka Nagaoka, Shizuoka (JP); Norihito Suzuki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/938,752

(22) Filed: Sep. 13, 2004

(65) Prior Publication Data

US 2005/0109089 A1 May 26, 2005

Related U.S. Application Data

(63) Continuation of application No. 09/987,652, filed on Nov. 15, 2001, now abandoned.

(30) Foreign Application Priority Data

Nov. 17, 2000  (JP) .......................... P2000-351098

(51) Int. Cl.
*G01M 19/00* (2006.01)
(52) U.S. Cl. .................. 73/118.1; 73/1.75; 33/1 N; 116/31
(58) Field of Classification Search ............. 73/118.1, 73/1.75; 33/1 N, 1 PT; 116/31
See application file for complete search history.

(56) References Cited

U.S. PATENT DOCUMENTS

| | | | |
|---|---|---|---|
| 4,614,869 A | 9/1986 | Hoshino et al. | |
| 4,683,375 A | 7/1987 | Hoshino et al. | |
| 4,839,579 A | 6/1989 | Ito et al. | |
| 5,004,915 A | 4/1991 | Umehara et al. | |
| 5,218,769 A | 6/1993 | Tranchon | |
| 5,248,939 A | 9/1993 | Brauer | |
| 5,971,782 A | 10/1999 | Masuda | |
| 6,144,027 A | 11/2000 | Weber | |
| 6,147,416 A | 11/2000 | Mitsuzuka | |
| 6,155,106 A1 | 5/2001 | Sano | |
| 6,225,582 B1 | 5/2001 | Stadler et al. | |
| 6,236,004 B1 | 5/2001 | Stadler et al. | |
| 6,271,515 B1 | 8/2001 | Matsumoto | |
| 6,367,337 B1 * | 4/2002 | Schlabach | .............. 73/862.331 |
| 6,403,900 B2 | 6/2002 | Hect et al. | |

(Continued)

FOREIGN PATENT DOCUMENTS

| | | |
|---|---|---|
| EP | 0 117 611 A2 | 9/1984 |
| EP | 0 913 319 A2 | 5/1999 |
| JP | 10-241504 | 9/1998 |
| WO | WO 9853275 A1 | 11/1988 |

OTHER PUBLICATIONS

Abstracts of Japan, 10-241504, Sep. 11, 1998.

*Primary Examiner*—Eric S. McCall
(74) *Attorney, Agent, or Firm*—Sughrue Mion, PLLC

(57) ABSTRACT

In a structure for mounting a steering angle sensor for a steering wheel for detecting a steering angle of a steering wheel, a fitting recessed portion 6 is provided in a side surface of a column (4) to which a steering-signal transmitting unit (3), a turn signal lever (1), and a wiper control switch lever (2) are attached, and a steering angle sensor (5) is inserted and fitted into the fitting recessed portion (6) from the side surface of the column (4).

5 Claims, 11 Drawing Sheets

U.S. PATENT DOCUMENTS

| | | |
|---|---|---|
| 6,417,468 B2 | 7/2002 | Hecht et al. |
| 6,420,697 B1 | 7/2002 | Donner et al. |
| 6,433,559 B1 | 8/2002 | Lahoreau et al. |
| 6,481,272 B1 | 11/2002 | Kieselbach |
| 2001/0035336 A1 | 11/2001 | Hecht et al. |
| 2001/0042678 A1 | 11/2001 | Hecht et al. |
| 2002/0026268 A1 | 2/2002 | Millsap et al. |
| 2002/0046937 A1 | 4/2002 | Matsumoto et al. |
| 2003/0019113 A1 * | 1/2003 | Kofink et al. ............... 33/1 PT |

* cited by examiner

STRUCTURE FOR MOUNTING STEERING ANGLE SENSOR FOR STEERING

This is a continuation of application Ser. No. 09/987,652, filed Nov. 15, 2001, now abandoned.

BACKGROUND OF THE INVENTION

The present invention relates to a structure for mounting a steering angle sensor on a steering wheel for detecting the steering direction and the steering angle of a steering wheel, and more particularly to a structure for mounting a steering angle sensor for a steering wheel which is improved in the assembling efficiency, the handling efficiency, and maintenance characteristics.

As shown in FIGS. 10 and 11, for example, a steering angle sensor for detecting the rotational angle of a steering wheel is arranged such that a steering angle sensor unit 105 is inserted from below and fitted into a sensor mounting recessed portion 106 formed in a lower portion of a column 104. A turn signal lever 101, a wiper control switch lever 102 and a steering-signal transmitting unit 103 which constitute a lever unit are attached to the column 104.

The steering angle sensor unit 105 has a circular hole 107 in its central portion, and a steering shaft is passed through the circular hole 107 so as to fix the steering angle sensor 105 to the column 104.

However, since the arrangement provided is such that the steering angle sensor unit 105 is mounted with the steering shaft passed therethrough, when a failure has occurred in the sensor unit, the steering wheel and the column 104 must be removed. In addition, in the case of an airbag-mounted vehicle, a connector for an airbag must be removed, so that a risk in operation is apprehended.

SUMMARY OF THE INVENTION

Accordingly, the object of the invention is to provide a structure for mounting a steering angle for a steering wheel which excels in the assembling efficiency, the handling efficiency, maintenance characteristics, and safety in operation.

In order to accomplish the above object, the present invention is characterized by having the following arrangement:

(1) A structure for mounting a steering angle sensor for detecting a steering angle of a steering wheel, wherein
a fitting recessed portion is provided in a side surface of a column to which a steering-signal transmitting unit, a turn signal lever, and a wiper control switch lever are attached, and the steering angle sensor is inserted and fitted into the fitting recessed portion from the side surface of the column.

(2) The structure according to claim (1), wherein a rotating disk linked to and integrally rotating with a rotating member of the steering-signal transmitting unit is provided on the column, and a subject detection portion formed in the rotating disk is inserted in a slit formed in a housing of the steering angle sensor.

(3) The structure according to claim (1), wherein a rotating disk linked to and integrally rotating with a rotating member of the steering-signal transmitting unit is provided on a column, and a sensor portion projecting from a housing of the steering angle sensor is disposed on one of an upper side and a lower side of a subject detection portion formed in the rotating disk.

(4) A steering angle sensor mounting structure comprising:
a steering angle sensor for detecting a steering angle of a steering wheel;
a column to which a steering-signal transmitting unit is attached, the steering-signal transmitting unit including a rotating member rotating about an axis; and
a fitting recessed portion provided in a surface of the column through which the axis does not pass,
wherein the steering angle sensor is inserted and fitted into the fitting recessed portion, so that the steering angle sensor detects the steering angle through the rotating member.

(5) The steering angle sensor mounting structure according to (4), wherein
the rotating member is provided with a rotating disk,
the steering angle sensor is provided with a slit, and
the rotating disk is inserted into the slit when the steering angle sensor is fitted to the column.

(6) The steering angle sensor mounting structure according to (4), wherein
the rotating member is provided with a rotating disk,
the steering angle sensor is provided with a sensor portion projecting therefrom, and
the sensor portion is disposed on one of an upper side and a lower side of the rotating disk.

(7) The steering angle sensor mounting structure according to (4), wherein
a turn signal lever and a wiper control switch lever are attached to surfaces of the column through which the axis does not pass, respectively.

In the invention, since the steering angle sensor is inserted into the fitting recessed portion from the side surface of the column so as to be mounted in the column, even if the steering angle sensor fails, the steering angle sensor can be removed from the column without removing the column and the like from the steering shaft, so that maintenance is facilitated. In addition, at the time of incorporating the steering angle sensor, it is unnecessary to assemble the steering angle sensor into the steering shaft, so that the assembling efficiency, the handling efficiency, and safety in operation improve substantially. In addition, maintenance can be provided even if a connector for an airbag is not removed, so that safety in operation can be ensured.

In addition to the abovementioned effect of the invention, since the subject detection portion formed in the rotating disk is inserted in the slit formed in the housing of the steering angle sensor, the sensor portion is protected by a housing body.

Further in addition to the abovementioned effect of the invention, although the sensor portion projects from the housing, since this sensor portion is inserted into the column, the sensor portion can be protected.

DETAILED DESCRIPTION OF PREFERRED EMBODIMENTS

Figure 1:
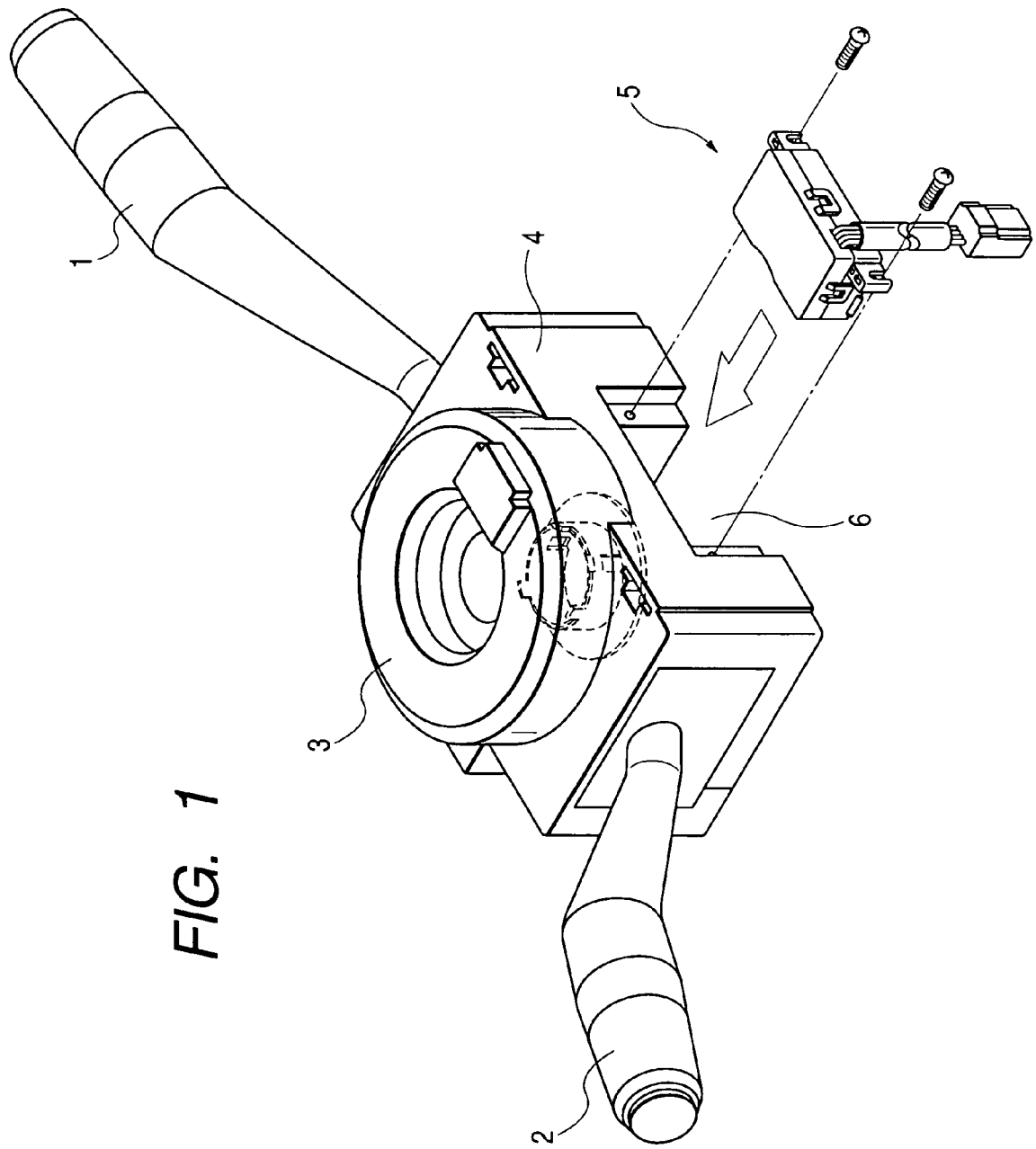
FIG. 1 is a perspective view illustrating a state before mounting a steering angle sensor in a column.

Referring now to the drawings, a detailed description will be given of a specific embodiment of the invention.

Arrangement for Mounting a Steering Angle Sensor

Figure 2:
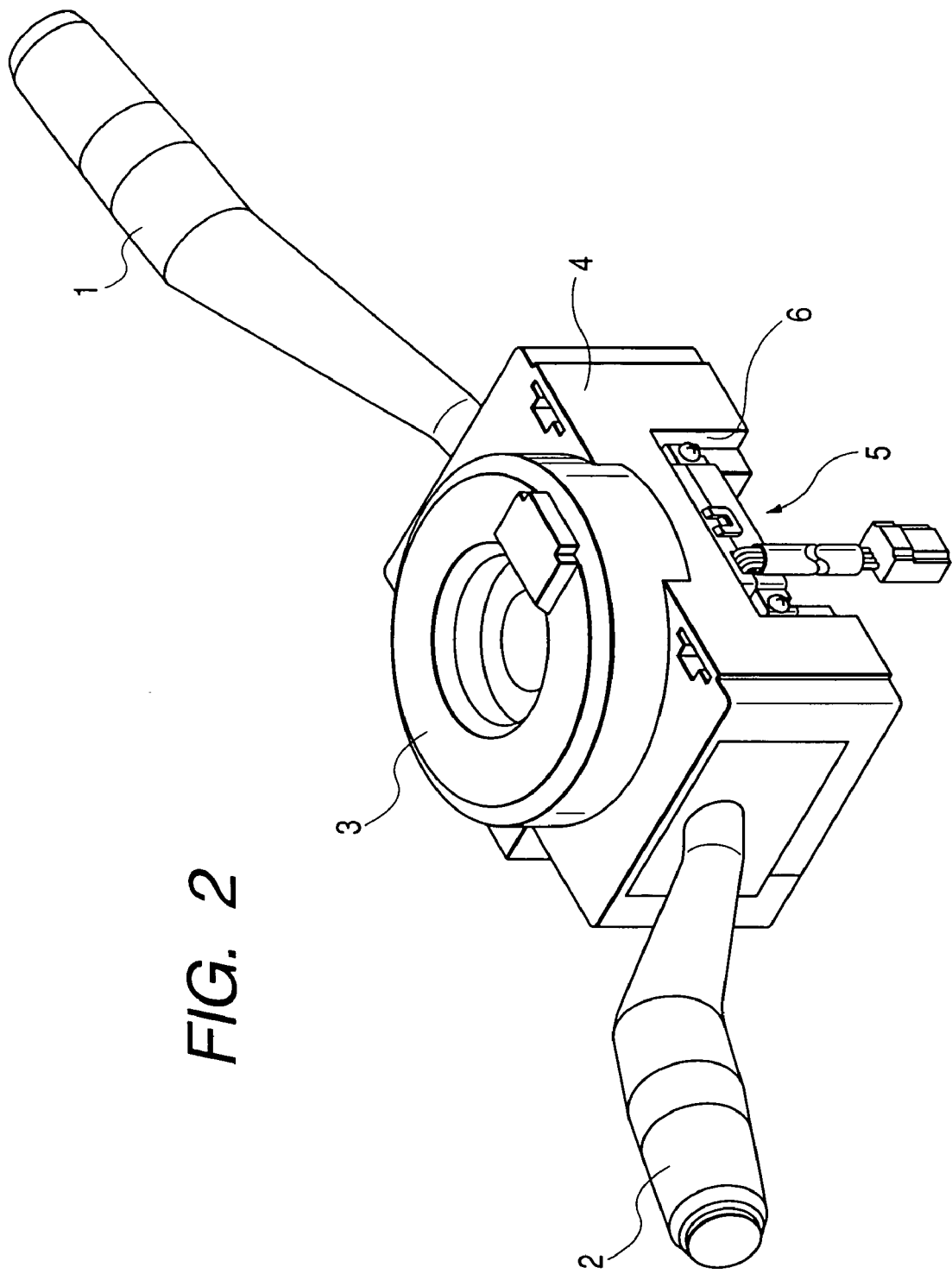
FIG. 2 is a perspective view illustrating a state in which the steering angle sensor has been mounted in the column.
Figure 3:
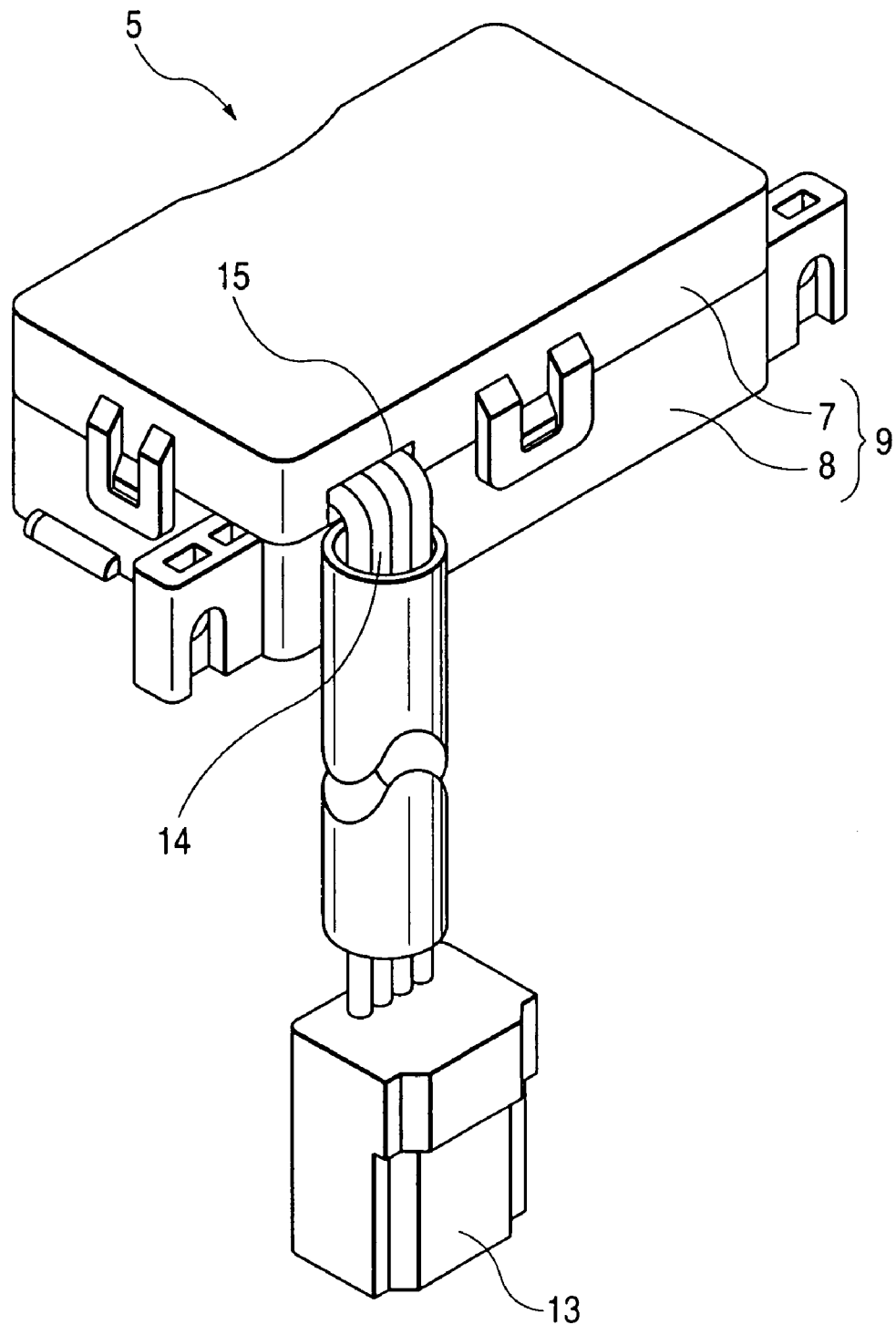
FIG. 3 is a perspective view of the steering angle sensor.
Figure 4:
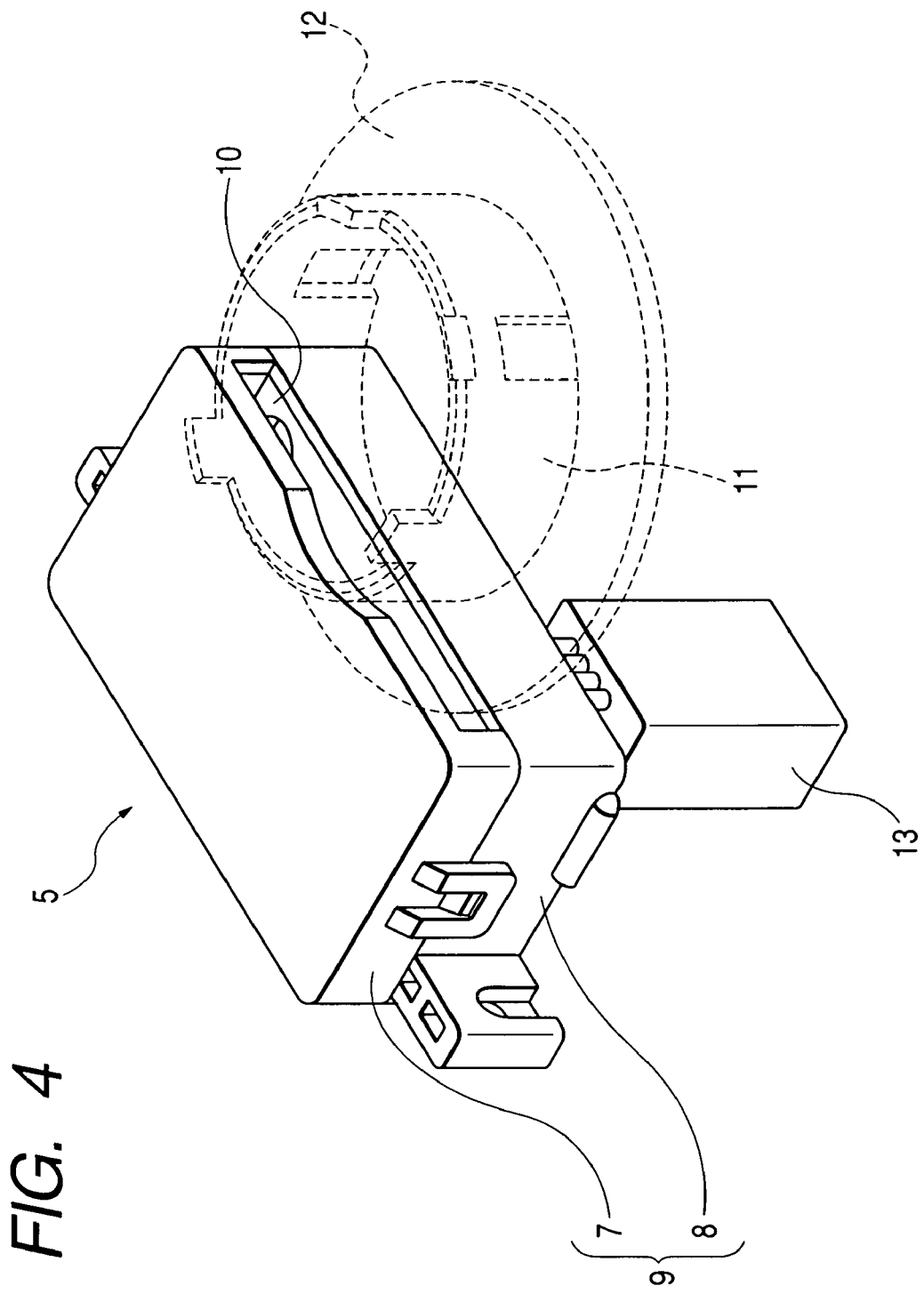
FIG. 4 is a perspective view illustrating a state in which a portion subject to detection of a rotating disk has entered a slit formed in a housing of the steering angle sensor.
Figure 5:
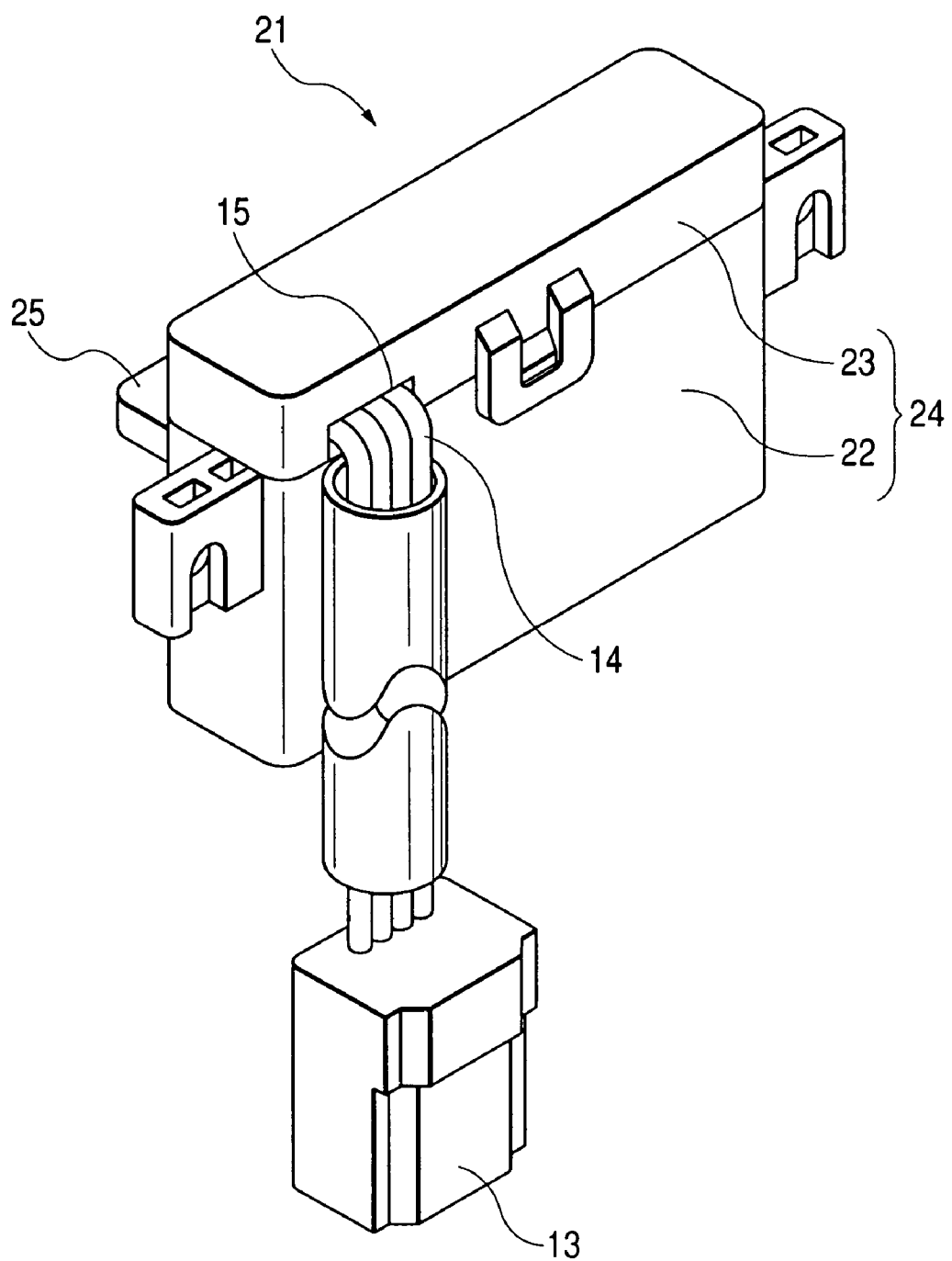
FIG. 5 is a perspective view of the steering angle sensor illustrating an example in which a sensor portion has projected from the housing.
Figure 6:
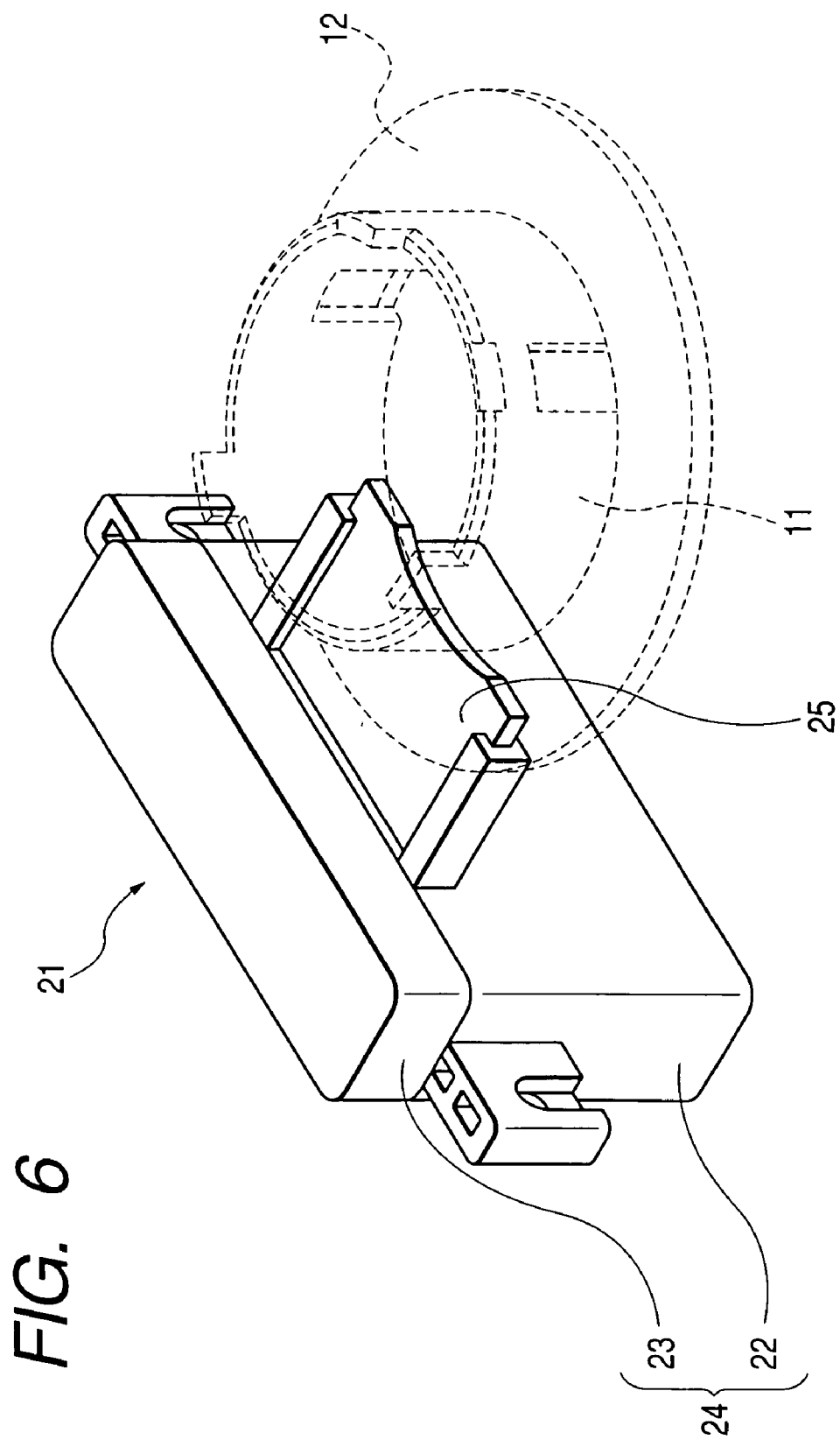
FIG. 6 is a perspective view illustrating a state in which the sensor portion projecting from the housing is disposed on the lower side of the subject detection portion of the rotating disk.

FIG. 1 is a perspective view illustrating a state before mounting the steering angle sensor in the column. FIG. 2 is a perspective view illustrating a state that the steering angle sensor is mounted in the column. FIG. 3 is a perspective view of the steering angle sensor. FIG. 4 is a perspective view illustrating a state that a portion subject to detection (hereafter referred to as a subject detection portion) of a rotating disk is putted in a slit formed in a housing of the steering angle sensor. FIG. 5 is a perspective view of the steering angle sensor illustrating an example in which a sensor portion projects from the housing. FIG. 6 is a perspective view illustrating a state in which the sensor portion projecting from the housing is disposed on the lower side of the subject detection portion of the rotating disk.

As shown in FIG. 1, the structure for mounting a steering angle sensor in accordance with this embodiment is arranged such that a steering angle sensor 5 is fitted to a column 4 to which a turn signal lever 1, a wiper control switch lever 2, and a steering-signal transmitting unit 3 which are constitute a lever unit are attached.

As shown in FIGS. 1 and 2, the turn signal lever 1 is attached by being fitted in a turn-signal-lever attaching hole formed in a right side surface of the column 4. The wiper control switch lever 2 is attached by being fitted in a wiper-control-switch-lever attaching hole formed in a left side surface of the column 4. The steering-signal transmitting unit 3 is disposed on a central portion of the main body of the column 4.

It should be noted that although, in this embodiment, the turn signal lever 1 is disposed on the right-hand side of the column 4 and the wiper control switch lever 2 on the left-hand side of the column 4, in the case of a left-hand drive vehicle, the turn signal lever 1 is disposed on the left-hand side of the column 4 and the wiper control switch lever 2 on the right-hand side of the column 4.

The steering-signal transmitting unit 3 is arranged such that cables for connecting various switches provided on a steering wheel and equipment provided on the vehicle body side are accommodated spirally in an annular space portion defined between a rotating member and a fixed member, and as the steering wheel is rotated, the cables are paid out from a peripheral surface of the rotating member or wound around the peripheral surface of the rotating member.

The steering angle sensor 5 is inserted and fitted into a fitting recessed portion 6, formed in a side surface of the column 4, from a lateral direction of the column 4, as shown by an arrow in FIG. 4. As shown in FIGS. 3 and 4, the steering angle sensor 5 is a so-called transverse type in which the sensor portion and a circuit board are accommodated in a housing body 9 constituted by an upper housing 7 and a lower housing 8 which are flat-shaped. A slit 10 as an elongated opening is formed in a front surface of this case body 9 on the side from which the case body 9 is inserted into the column 4. A flange-like magnetic disk 12 is adapted to be inserted in the slot 10. The magnetic disk 12 is integrally formed with a lower end of an annular linking portion 11 linked to the rotation member of the steering-signal transmitting unit 3 and rotates with the rotating member.

A subject detection portion having a magnetic pattern in which, for instance, the subject detection portion alternately magnetized with an north pole and a south pole is formed in a periphery of the magnetic disk 12. This subject detection portion is inserted into the slit 10, and a magnetic sensor, mounted on a circuit board 35 disposed in the slit 10, detects the relative density of magnetic lines generated from the magnetized magnetic disk 12. The detected relative density of the magnetic lines is subjected to signal processing to detect the steering angle of the steering wheel.

It should be noted that, as shown in FIG. 3, a lead-out hole 15 for leading, from the circuit board to outside the case body 9, electric wires 14 having a connector 13 provided at their tips is formed in a rear surface of the housing body 9.

In the above-described construction, since the steering angle sensor 5 is inserted into the fitting recessed portion 6 from the side surface of the column 4 so as to be mounted in the column 4, even if the steering angle sensor 5 fails, the steering angle sensor 5 can be removed from the column 4 without removing the column 4 and the like from the steering shaft, so that maintenance is facilitated. In addition, at the time of incorporating the steering angle sensor 5, it is unnecessary to assemble the steering angle sensor 5 into the steering shaft, so that the assembling efficiency, the handling efficiency, and safety in operation improve substantially. In addition, maintenance can be provided even if a connector for an airbag is not removed, so that safety in operation can be ensured. Furthermore, since the subject detection portion formed in the magnetic disk 12 is inserted in the slit 10 formed in the housing body 9 of the steering angle sensor 5, the sensor portion is protected by the housing body 9.

First Modification of the Steering Angle Sensor

FIGS. 5 and 6 show another example of the steering angle sensor according to the present invention. This steering angle sensor 21 is a so-called vertical type in which the circuit board is accommodated in a housing body 24 constituted by a vertically elongated lower housing 22 and an upper housing 23 functioning as a cover. A sensor portion 25 projects horizontally from the front surface of the case body 24 on this side from which the case body 24 is inserted into the column 4. The sensor portion 25 is disposed on an upper or lower side of the magnetic disk 12 in such a manner as to oppose the magnetic pattern formed on the magnetic disk 12.

It should be noted that the lead-out hole 15 for leading from the circuit board to outside the case body 24 the electric wires 14 having the connector 13 provided at their tips is formed in the rear surface of the housing body 24.

According to this steering angle sensor 21, although the sensor portion 25 projects from the housing body 9, since this sensor portion 25 is inserted into the column 4, the sensor portion 25 can be protected.

Second Modification of the Steering Angle Sensor

Figure 7:
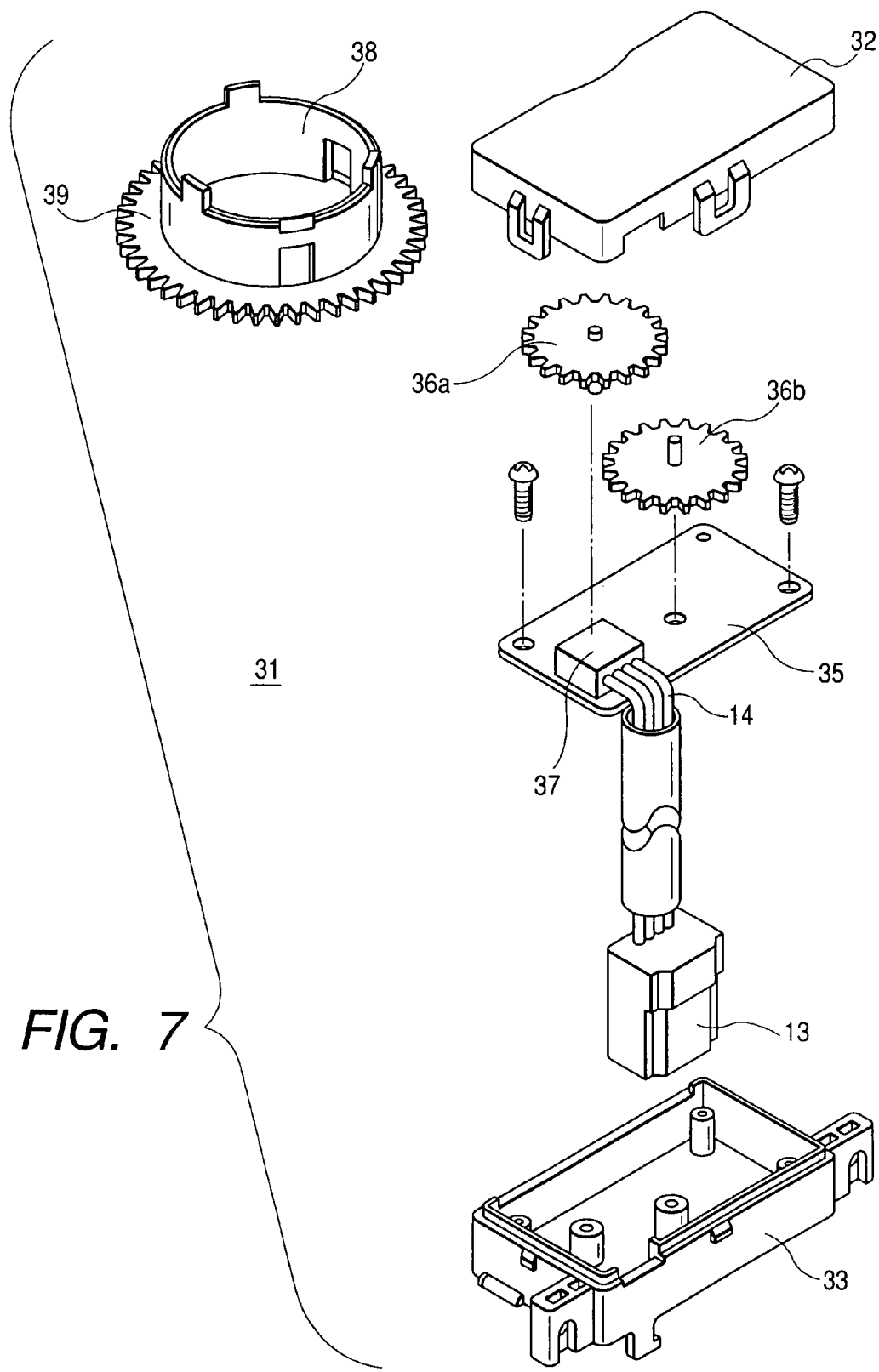
FIG. 7 is an exploded perspective view of a steering angle sensor using a magnetic gear.
Figure 9:
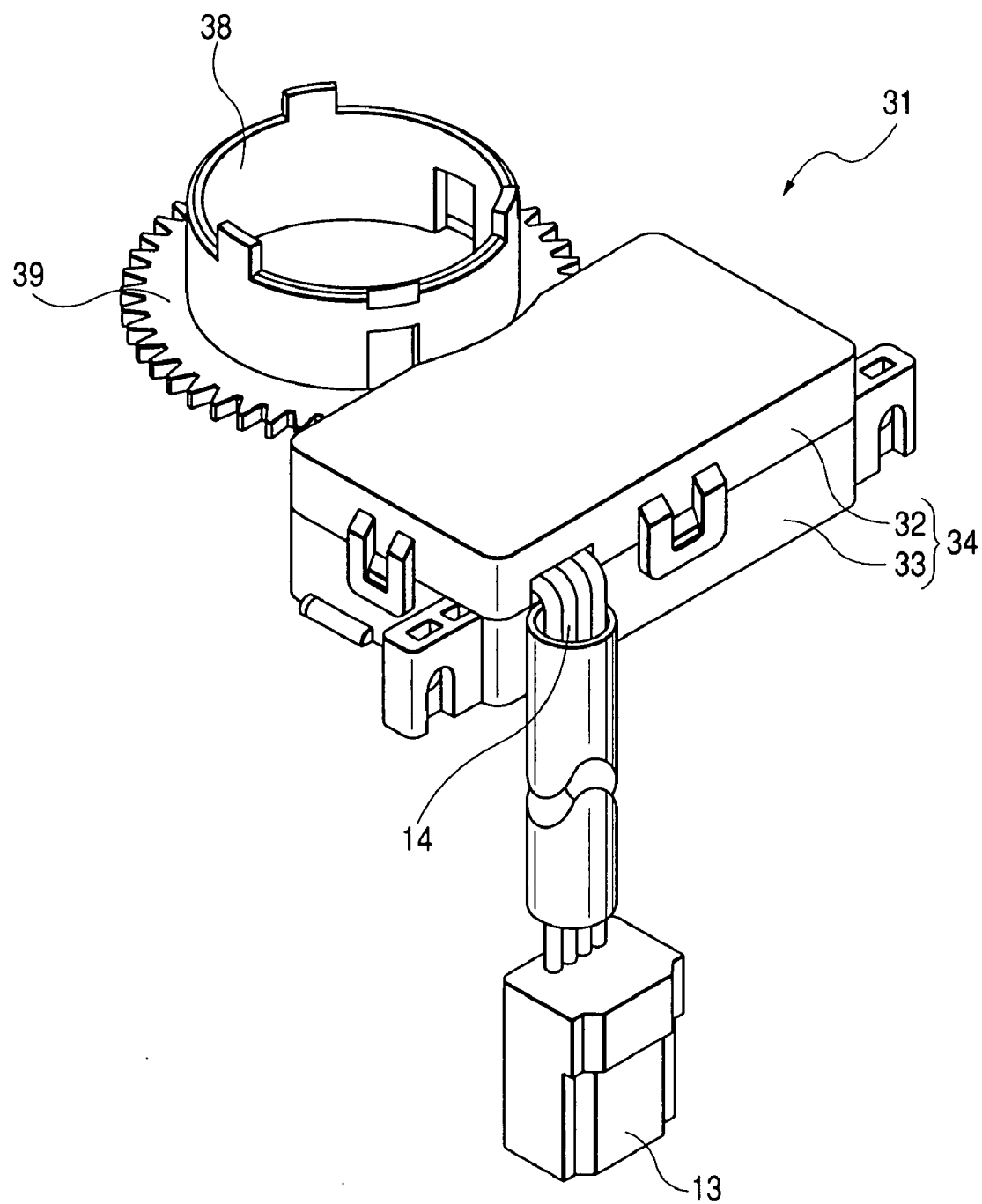
FIG. 9 is an exploded perspective view of the steering angle sensor using the magnetic gear.
Figure 10:
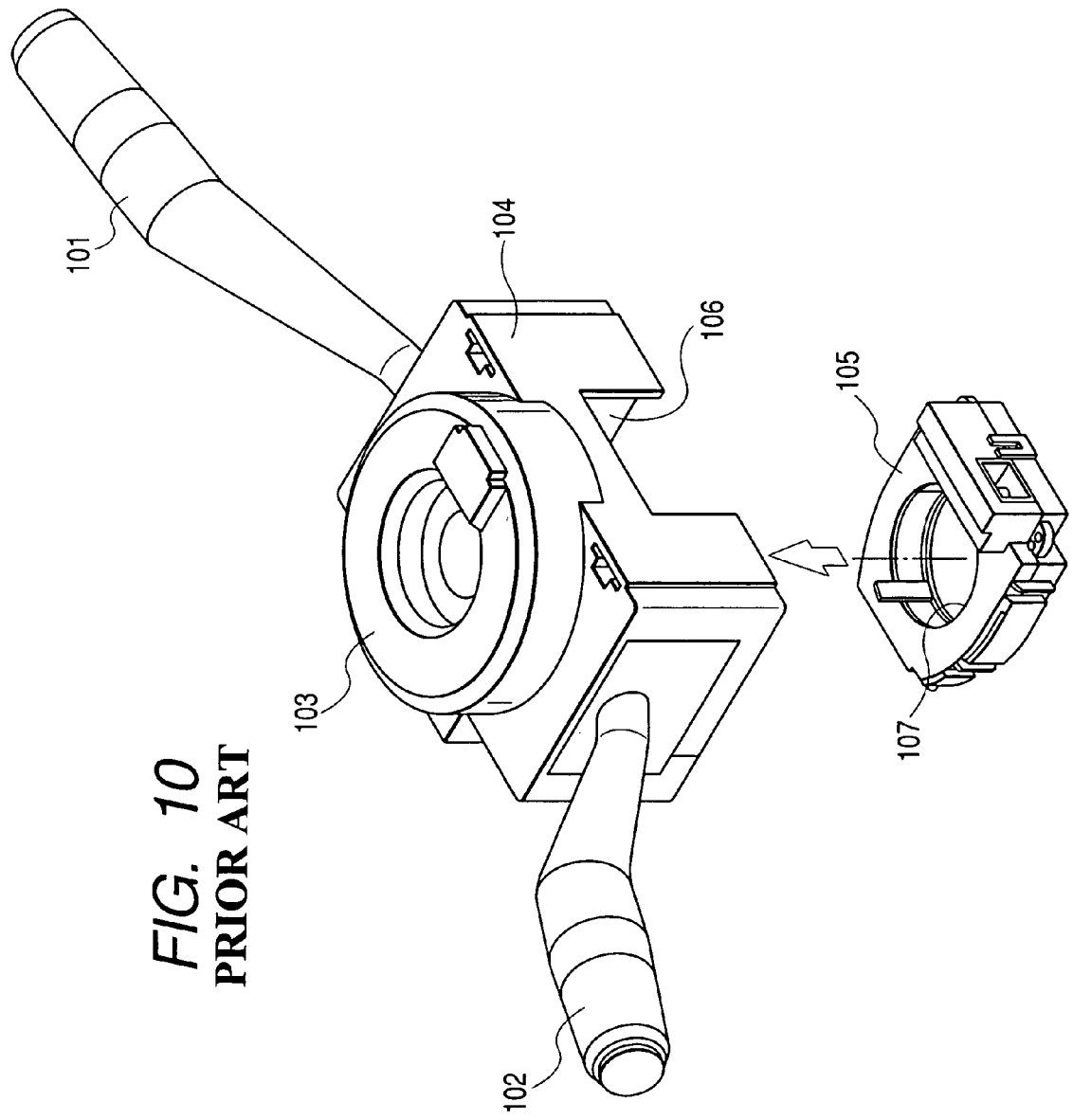
FIG. 10 is a perspective view illustrating a state before a related steering angle sensor is assembled from below into the column.
Figure 11:
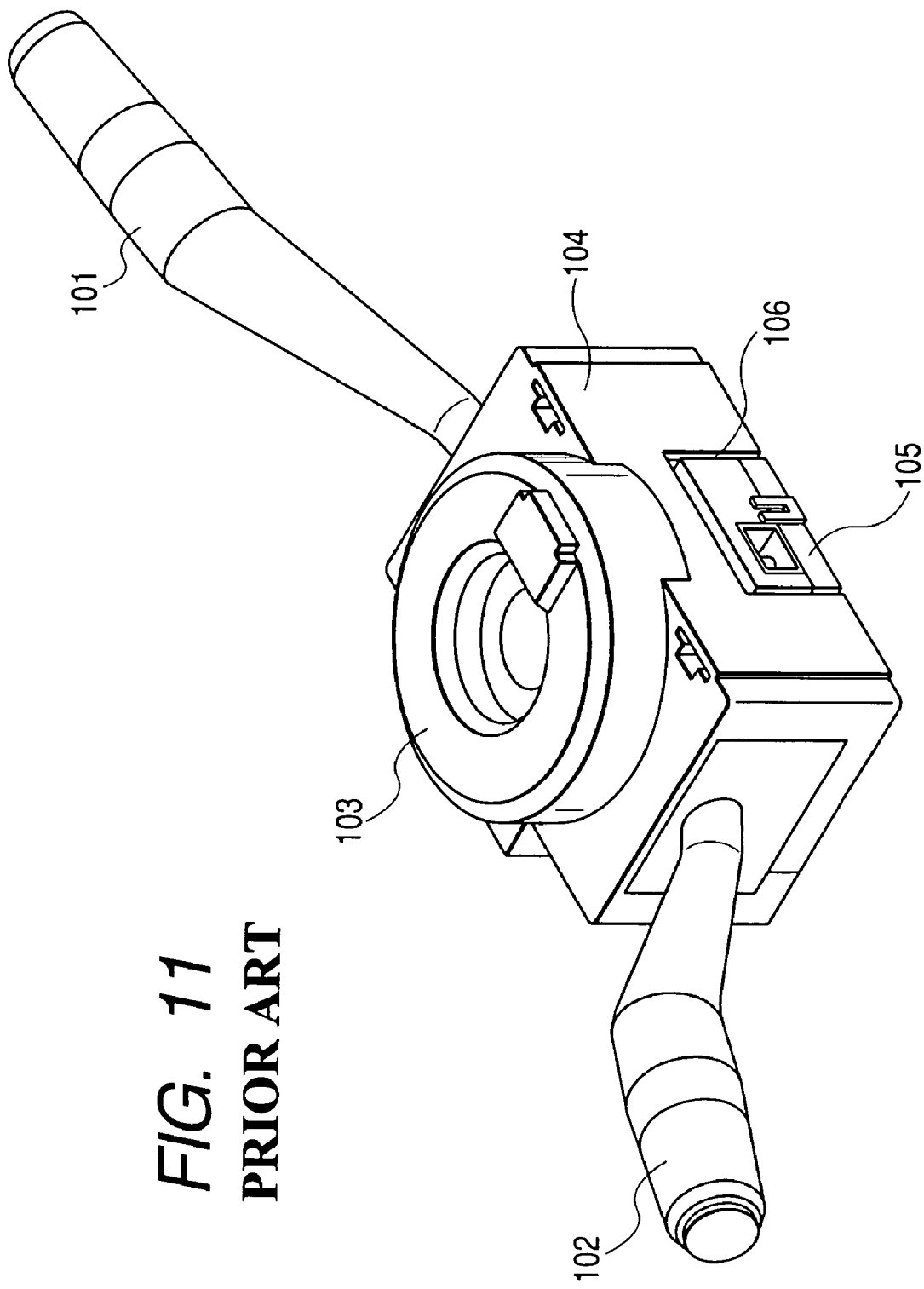
FIG. 11 is a perspective view illustrating a state in which the related steering angle sensor is assembled from below into the column.

FIGS. 7 and 9 show another example of the steering angle sensor. This steering angle sensor 31 is a sensor of the transverse type shown in FIG. 3. A circuit board 35, a connecting gear 36a provided rotatably on the circuit board 35, and a magnetic gear 36b are accommodated in a housing body 34 constituted by an upper housing 32 and a lower housing 33.

As shown in FIG. 7, a connector 37, for connecting the ends of the electric wires 14 having the connector 13 provided at their tips, is provided on the circuit board 35. As the magnetic gear 36b, one in which a magnetic material is molded into a gear shape or one in which a plastic magnet is formed into a gear shape, is used. The connecting gear 36a is adapted to be engaged with a rotating gear 39 formed integrally with a lower end of a linking portion 38 for linking to the rotating member of the steering-signal transmitting unit 3, and transmits the rotation of the rotating gear 39 to the magnetic gear 36b.

In this gear mechanism, a reduction gear is employed for detecting the rotation of the steering wheel within one rotation of the magnetic gear 36b, that is, the maximum rotation amount of the steering wheel is defined by one rotation off the magnetic gear 36b. For example, in an automobile, since the steering wheel undergoes two revolutions for each of the left and right turns, the steering wheel undergoes four turns in total. Thus, the magnetic gear 36b is decelerated so as to undergo one revolution when the steering wheel undergoes four revolutions. At that time, any number of gears may be used in the reduction gear mechanism. Further, an arbitrary reduction gear ratio is not fixed, and may be set arbitrarily.

The subject detection portion having the magnetic pattern in which, for instance, the subject detection portion alternately magnetized with an north pole and a south pole is formed in the magnetic gear 36b, and the relative density of magnetic lines generated from the magnetic gear 36b is detected by the magnetic sensor mounted on the circuit board 35, and is subjected to signal processing to detect the steering angle of the steering wheel.

Although a description has been given above of the embodiment, the invention is not limited to the same, and various modifications without departing from the gist of the invention are possible.

Figure 8:
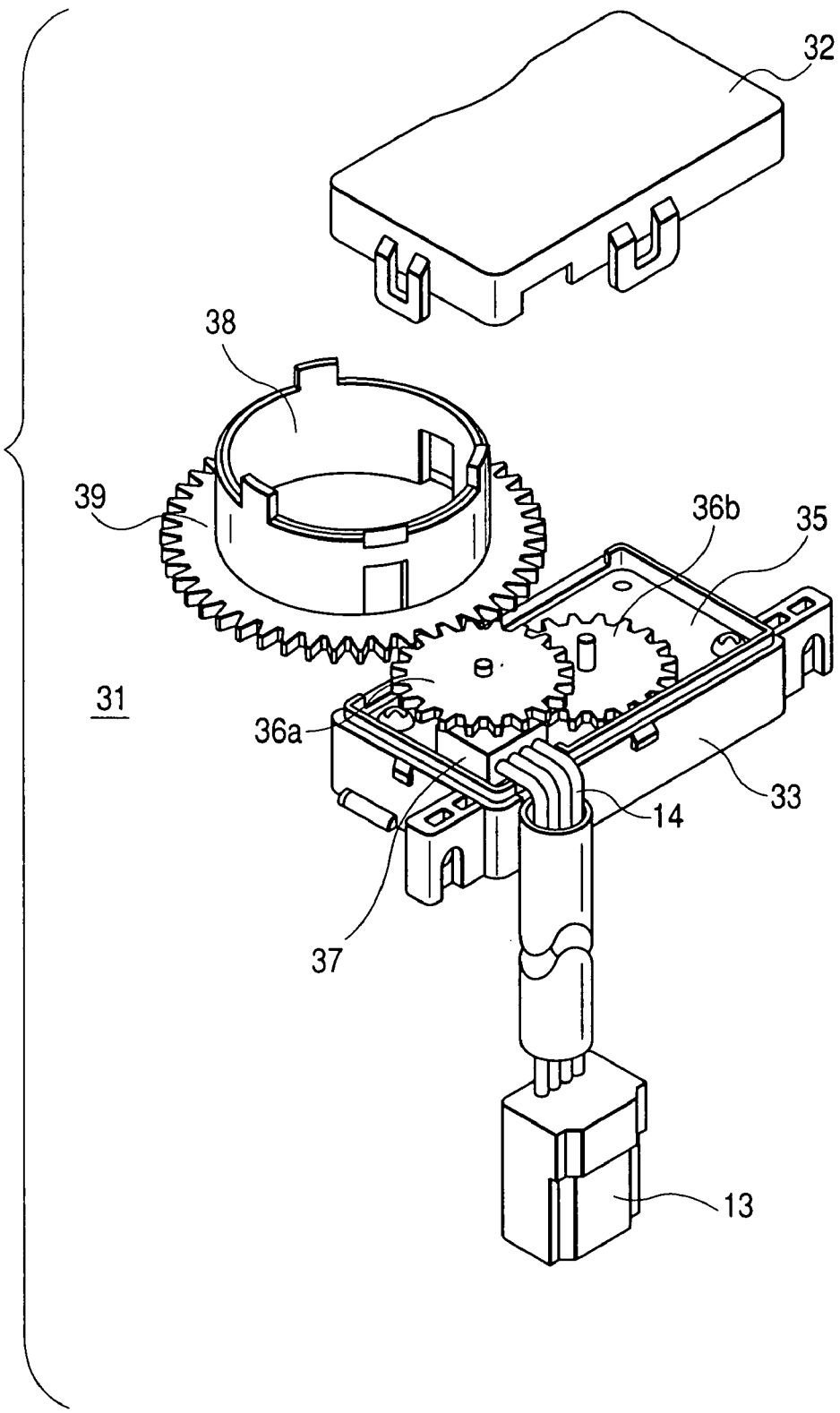
FIG. 8 is an exploded perspective view of the steering angle sensor using the magnetic gear and illustrates a state in which an upper housing is removed.

For example, if a slit is formed in the magnetic gear 36b shown in FIGS. 8 and 9, the steering angle of the steering wheel can be detected optically.

As is clear from the foregoing description, in accordance with the invention, since the steering angle sensor is inserted into the fitting recessed portion from the side surface of the column so as to be mounted in the column, even if the steering angle sensor fails, the steering angle sensor can be removed from the column without removing the column and the like from the steering shaft, so that maintenance is facilitated. In addition, at the time of incorporating the steering angle sensor, it is unnecessary to assemble the steering angle sensor 5 into the steering shaft, so that the assembling efficiency, the handling efficiency, and safety in operation improve substantially. In addition, maintenance can be provided even if a connector for an airbag is not removed, so that safety in operation can be ensured.

Further, in accordance with the invention, since the subject detection portion formed in the rotating disk is inserted in the slit formed in the housing of the steering angle sensor, the sensor portion can be protected by a housing body.

Further, in accordance with the invention, although the sensor portion projects from the housing, since this sensor portion enters the column, the sensor portion can be protected.

What is claimed is:

1. A steering angle sensor mounting structure comprising:
a steering angle sensor for detecting a steering angle of a steering wheel, which includes a first gear exposed to outside of the steering angle sensor;
a column to which a steering-signal transmitting unit is attached, wherein the steering-signal transmitting unit includes a rotating gear that is rotated about an axis and exposed to outside of the steering-signal transmitting unit for transmitting a rotation of a steering; and
a fitting recessed portion provided in a surface of the column through which the axis does not pass,
wherein when the steering angle sensor is inserted and fitted into the fitting recessed portion, the first gear of the steering angle sensor is engaged with the rotating gear of the steering-signal transmitting unit so that the steering angle sensor detects the steering angle through the rotating gear of the column.

2. The steering angle sensor mounting structure according to claim 1, wherein the steering angle sensor includes a second gear engaged with the first gear, and a circuit board that detects a rotation of the second gear.

3. The steering angle sensor mounting structure according to claim 2, wherein the second gear is a magnetic gear having a magnetic pattern in which a subject detection portion of the second gear is alternately magnetized with a north pole and a south pole,
wherein the circuit board detects the magnetic pattern.

4. The steering angle sensor mounting structure according to claim 2, wherein the first gear, the second gear and the rotating gear constitute a differential gear.

5. The steering angle sensor mounting structure according to claim 1, wherein
a turn signal lever and a wiper control switch lever are attached to surfaces of the column through which the axis does not pass, respectively.

* * * * *